United States Patent
Prabhu et al.

(10) Patent No.: US 10,540,699 B1
(45) Date of Patent: Jan. 21, 2020

(54) METHODS AND SYSTEMS FOR SCENE DRIVEN CONTENT CREATION

(71) Applicant: Amazon Technologies, Inc., Seattle, WA (US)

(72) Inventors: Ranjit Naresh Prabhu, Bellevue, WA (US); Cecilia Ambros, Seattle, WA (US); Steven Bass, Seattle, WA (US); Janet Ellen Galore, Seattle, WA (US); David Hiroshi Hijirida, Seattle, WA (US); Alisson Lia Laut, Seattle, WA (US); Carlos Marin Burgos, Seattle, WA (US); Timothy Andrew Ong, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 463 days.

(21) Appl. No.: 15/369,790

(22) Filed: Dec. 5, 2016

(51) Int. Cl.
*G06Q 30/00* (2012.01)
*G06Q 30/06* (2012.01)
*G06F 3/0484* (2013.01)
*G06F 3/0482* (2013.01)
*H04N 5/77* (2006.01)
(Continued)

(52) U.S. Cl.
CPC ....... *G06Q 30/0609* (2013.01); *G06F 3/0482* (2013.01); *G06F 3/04842* (2013.01); *G11B 27/031* (2013.01); *H04N 5/77* (2013.01); *H04N 5/907* (2013.01)

(58) Field of Classification Search
CPC ............... G06Q 30/00; G06Q 30/0601; G06Q 30/0609; G11B 27/031; H04N 5/77; H04N 5/907; G06F 3/0482; G06F 3/04842
See application file for complete search history.

(56) References Cited

U.S. PATENT DOCUMENTS

| | | | | |
|---|---|---|---|---|
| 7,496,845 | B2* | 2/2009 | Deutscher | H04N 5/44543 715/721 |
| 9,008,491 | B2* | 4/2015 | Kulas | H04N 21/443 386/239 |
| 9,578,256 | B1* | 2/2017 | Gregg | H04N 5/262 |

(Continued)

OTHER PUBLICATIONS

Pei Xu et al. "Will video be the next generation of e-commerce product reviews? Presentation format and the role of product type", Decision Support Systems 73 (2015) 85-96, © 2015 Elsevier B.V. (Year: 2015).*

*Primary Examiner* — Naeem U Haq

(74) *Attorney, Agent, or Firm* — Eversheds Sutherland (US) LLP

(57) ABSTRACT

Systems, methods, and computer-readable media are disclosed for scene driven content creation. The systems, methods, and computer-readable media described herein may improve user experiences and speed of operation. In an example embodiment described herein, a method may include receiving a request for creating audiovisual content, providing a list of scene identifiers that are associated with a list of scenes for display, receiving data indicative of a first user selection selecting the first scene, providing data comprising an identifier of the first scene and an identifier of a first product associated with an audiovisual review, for display at an audiovisual capturing device during recording of the first scene, and providing the first scene for storage at a data store in association with the identifier of the first scene and the identifier of the first product.

20 Claims, 13 Drawing Sheets

(51) Int. Cl.
*H04N 5/907* (2006.01)
*G11B 27/031* (2006.01)

(56) References Cited

U.S. PATENT DOCUMENTS

| | | | |
|---|---|---|---|
| 9,703,463 B2* | 7/2017 | Avedissian | G06Q 30/0261 |
| 9,741,057 B2* | 8/2017 | Avedissian | H04N 21/44016 |
| 9,899,063 B2* | 2/2018 | Avedissian | G06Q 30/0261 |
| 10,007,936 B1* | 6/2018 | Ghoshal | G06Q 50/01 |
| 10,121,187 B1* | 11/2018 | Nair | G06Q 30/0643 |
| 2011/0153605 A1* | 6/2011 | Silverman | G06F 16/58 |
| | | | 707/737 |
| 2012/0062793 A1* | 3/2012 | Vanderhoff | H04N 5/04 |
| | | | 348/514 |
| 2012/0110455 A1* | 5/2012 | Sharma | G06Q 10/101 |
| | | | 715/719 |
| 2013/0282611 A1* | 10/2013 | Avedissian | G06Q 30/02 |
| | | | 705/347 |
| 2013/0283301 A1* | 10/2013 | Avedissian | H04N 21/44016 |
| | | | 725/5 |
| 2013/0283307 A1* | 10/2013 | Avedissian | G06Q 30/0214 |
| | | | 725/23 |
| 2014/0150029 A1* | 5/2014 | Avedissian | G06Q 30/0261 |
| | | | 725/60 |
| 2017/0229156 A1* | 8/2017 | Avedissian | G11B 27/34 |
| 2018/0101524 A1* | 4/2018 | Dunnihoo | G06F 3/04847 |
| 2018/0300774 A1* | 10/2018 | Ghoshal | G06Q 50/01 |

* cited by examiner

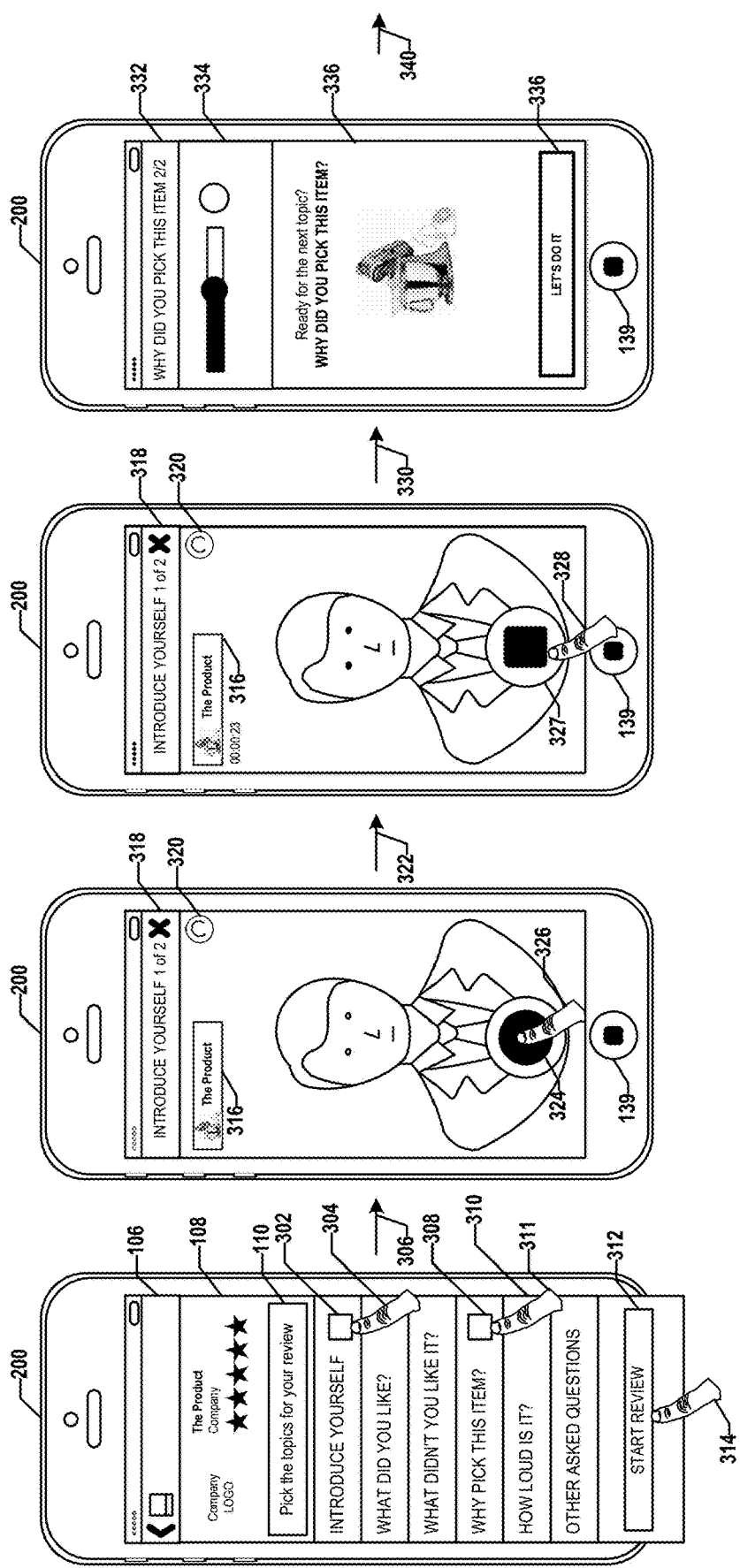

US 10,540,699 B1

METHODS AND SYSTEMS FOR SCENE DRIVEN CONTENT CREATION

BACKGROUND

Electronic devices are now an integral part of everyday life. Many of the electronic devices that are widely used are mobile devices (e.g., mobile phones, laptops, tablets, and/or the like). Users may use such devices to create custom audiovisual content. However, many challenges face users when creating and retrieving such content. For example, a user may struggle to create an organized video review of an item. Similarly, users may be required to view entire videos in order to locate a portion of a video review that is relevant to a subject matter of interest. Such actions may lead to a poor customer experience as well as increase the computational load on both server resources and network bandwidth utilized by the user seeking relevant information.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 2, 3A-3B depict a device operating according to one or more example embodiments of the disclosure.

DETAILED DESCRIPTION

Figure 1A:
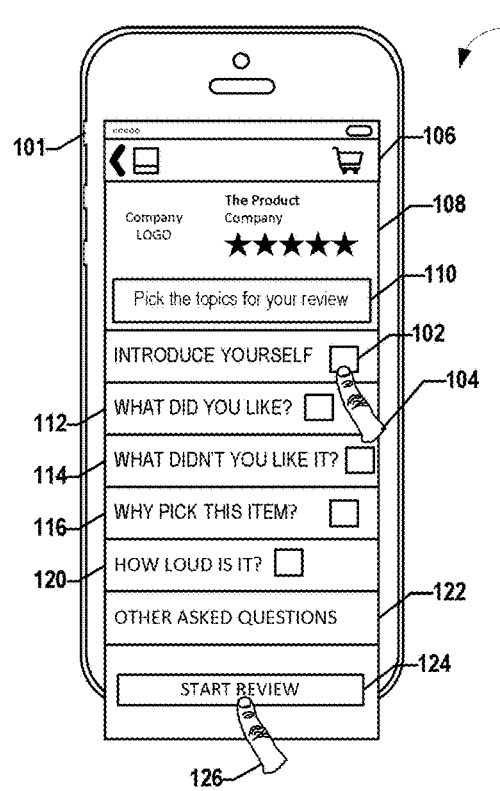
FIGS. 1A-1B illustrate an environment where one or more devices may operate in accordance with one or more example embodiments of the disclosure.

This disclosure relates to, among other things, systems, methods, computer-readable media, techniques, and methodologies for a scene driven content creation, for example, videos relating to product reviews, do-it-yourself, how-to and other similar content.

Generally, users may provide and access audiovisual reviews (e.g., video reviews) for a product on a product page, such as may be provided at an online retail website or a video sharing website. However, users may have to watch a large portion of one or more video reviews in order to view a portion of the review associated with a particular question the user has about the product. For example, if a user is shopping for a blender and is concerned about how loud the blender is, the user may have to watch fifteen video reviews, each 3 minutes long, or 45 minutes of video content, where a number of these video review may not even address how loud the blender operates, and those that do may only spend 20 seconds each on that topic. Thus, in order to obtain 3-5 minutes of relevant content the user may have to watch 45 minutes of video. The term audiovisual is used herein to describe content that includes audio and/or visual content (e.g., video content and sound content).

In one implementation, a user creating a video review may be provided with a scene driven content creation tool for generating a product review video that includes a number of discrete scenes recorded by the user, each scene directed to a topic. The scenes may be recorded individually and tagged according to the topic to which that scene is directed. The whole review video may also be tagged. The tags may be used to catalog, sort and search the full review and/or the individual scenes of the review in a targeted fashion. By fragmenting the review into discrete scenes, the user seeking specific information about a product may more efficiently access that information, thereby reducing the load on the network and server resources supporting that user experience.

In an illustrative embodiment, a user seeking to create a video review for a product using a user device, such as a desktop computer, laptop computer, tablet, smart phone, etc., may be presented with a Graphical User Interface (GUI) displayed at the user device (e.g., mobile device) to guide the user through audiovisual content creation. For example, the GUI may guide the user during the creation of a video review directed to a specific product. The GUI may provide a variety of predetermined topics for selection. The topics presented to the user may include topics that are commonly included in video reviews, such as an introduction. However, other topics may be determined from customer questions (e.g., FAQ's), or comments about the product. For example, the topics may be determined from mining social media, the number of views or ratings associated with scenes for the same or similar topics and/or products and/or the like. In some instances the user may be given the option to create his or her own topic.

Once the user selects a topic the user may be guided through recording a scene associated with the topic. For example, an overlay may be provided over an audiovisual recording interface of the user device. For example, the overlay may be provided over a recording interface for a video camera of a mobile device. The overlay may display the topic over the audiovisual recording interface to provide the user guidance while recording the scene. The overlay may also display a name or an identifier of a product being reviewed. The user may interact with the audiovisual recording interface to begin and end recording of the scene associated with the topic. Upon completion of the recording, the user may select to continue creation of audiovisual content (e.g., more scenes) by selecting a second scene associated with a second topic in a similar manner.

The plurality of scenes (e.g., first and second scene in this example) may be then saved to a data store (e.g., hard drive, database, and/or the like) along with an identifier for the reviewed product, tags identifying the respective topic associated with each scene, an identifier for the user, and/or other information. In one implementation, a pre-specified order of scenes is fetched from the data store. In one implementation, an order of scenes may be provided by the user and saved to the data store.

The audiovisual reviews (e.g., video reviews) and scenes may be provided to shoppers and/or users in multiple manners simultaneously. For example, a section or portion of a product page may include full reviews associated with that product, wherein the full reviews may be a collection of a plurality of scenes arranged in a predetermined or pre-specified order. The scenes of the full review may respectively be associated with various topics that relate to the product. At the same section or portion or at a different section or portion of the product page individual scenes may be presented. The full reviews and/or the individual scenes associated with that product or a competitive or similar product may be arranged by popularity (for example, the number of views or rating), topic, creator (for example, the person that created the review or scene may be considered a verified purchaser, meet a threshold of helpful votes, meet a threshold ranking as a reviewer, etc.). Accordingly, users and/or shoppers may select to view one or more full reviews from a selection of full reviews, or they may select to view one or more scenes individually, for example, scenes directed to respective topics of interest to that user or shopper. In addition, the user or shopper may be able to search full reviews and/or scenes at the product page using, for example, key words or preloaded search criteria/questions that can then be compared to the tags associated with the respective full reviews and individual scenes to identify matches.

Similarly, scenes or links to scenes may be provided for user selection. The scenes or links to scenes may be provided within a portion of a user's written review for the product that addresses a respective topic associated with a particular scene. For example, a user written review including a portion discussing what he/she liked the most about a product may include a link to a scene having the same topic. In one implementation, a frequently asked question section that includes common questions and answers associated with the product being reviewed. The section may also include scenes and/or links to scenes having topics that match respective frequently asked questions. For example, a frequently asked question associated with a first product may be "How loud is it?" This frequently asked question may have a plurality of answers from different reviewers. These written answers may respectively be accompanied by audiovisual content or scenes that are created during the making of the full review as a response to the selection of the "How loud is it?" topic from the menu of topics presented to the user. Alternatively, a user writing a review may identify a scene created by another that is directed to a topic relevant to the written review, such that a scene saved in association with the "How loud is it?" topic (e.g., loading previously recorded scene that is tagged in association with a topic) may be linked to the user's written review. Users and/or shoppers reading the review may then directly access the linked scene.

Embodiments of the disclosure may improve the user experience, reduce computational stress of servers, reduce maintenance costs of servers and, in turn, increase revenue. By allowing users to directly access audiovisual content most relevant to the user, unnecessary traffic resulting from streaming audiovisual content not relevant may be reduced. In turn, the computational stress, power consumption, maintenance costs of servers are also reduced. Allowing users to quickly and efficiently access audiovisual content most relevant to their needs and/or searches also enhances the user experience. In turn, this may increase an amount of purchases made by users. Naturally, increasing the amount of purchases while reducing the operational costs may yield greater revenue.

FIG. 1A illustrates an environment 100A where one or more devices may operate in accordance with one or more example embodiments of the disclosure. FIG. 1A depicts a mobile device 101. In one implementation, the mobile device 101 may include a display device and one or more interaction elements (e.g., buttons, dials, touch screen, motions sensors, camera, and/or the like). The mobile device 101 may receive an interaction requesting guidance during audiovisual content creation. The mobile device 101 may display a GUI as depicted in FIG. 1A. The mobile device 101 may display section 106. Section 106 may include a first interaction element that allows the user to view a shopping cart including products that the user added to a virtual shopping cart. Section 106 may also include a browsing element and/or a mobile browsing element. The browsing element and/or mobile browsing element may be an element that allows the mobile device 101 to navigate through different pages of a retailer website.

The mobile device 101 may also display section 108. Section 108 may include an element displaying a product identifier (e.g., product name) for the product being reviewed. Section 108 may also display an identifier of a manufacturer or distributor of the product (e.g., manufacturer name and/or logo, distributor name and/or logo). Section 108 may also include an element that displays an overall star rating of the product being reviewed. The user may, for example, select a rating between one star and five stars for the product. In one implementation, the user may interact with an element that displays the overall star rating to provide a rating between one star and five stars for the product.

Element 110 may provide instructions to the user to guide the user during the audiovisual content creation. In the depicted implementation, the element 110 provides instructions to the user to select a topic for a first scene of an audiovisual review. The user may select between a first topic 102 for the scene "introduce yourself," a second topic 112 "what did you like?," a third topic 114 "what didn't you like?," a fourth topic 116 "why pick this item?," and a fifth topic 120 "how loud it is?" The user may also select collapsible element 122 that when interacted with displays additional topics. For example, interaction with element 122 may cause a graphical element to be expanded to display additional topics for selection. As depicted, the user may interact with element 102 to select the "introduce yourself" topic via user interaction 104. In turn, the user may interact with element 124 to start the recording of the selected scene via user interaction 126.

In one implementation, the topics presented via the GUI may be predetermined or preselected, or they may be user defined. The predetermined topics may include those that are typical or expected for the content being created, such as an introduction and a conclusion when creating a product review. Other predetermined topics may be topics identified from frequently asked questions associated with the product. Other predetermined topics may be identified by mining or analyzing social media data, sales data, marketing data and the like. Other predetermined topics may be identified based on metric data associated with existing content, such as the number of views or the rating of videos or scenes directed to or including a specified topic (for example, to add more videos and/or scenes directed to the specified topic), and/or the like. The listing or menu of topics presented to via the GUI may be dynamically generated for a certain content creation session or predetermined prior to the user selecting the option to create content, such as a video review. In addition, if the user has created content in the past, then the GUI, such as in the menu of topics presented, may indicate that the user may reuse one or more scenes previously recorded by the user, such as an introduction, for example, the "introduce yourself" scene. In some examples, a user may update previously recorded scenes with a new scene (e.g., introduce yourself).

Figure 1B:
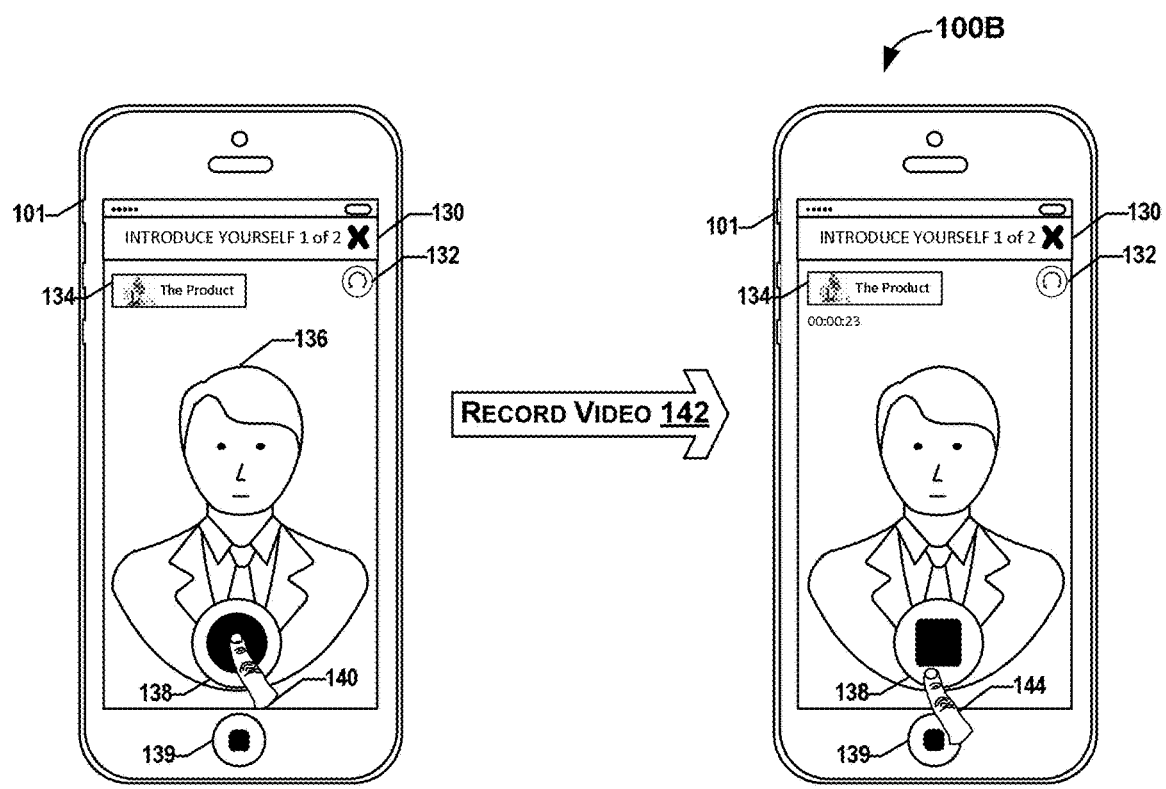

FIG. 1B illustrates an environment 100B where one or more devices may operate in accordance with one or more example embodiments of the disclosure. FIG. 1B depicts the mobile device 101. The mobile device 101 may display element 130 including an identifier (e.g., scene topic) of the scene being recorded. In the depicted embodiment, element 130 may also display an indication of the number of consecutive scenes that will be recorded during a current guided audiovisual creation session. Element 134 may display a product identifier (e.g., a product name) associated with the scene being recorded. Element 136 displays a current view of an audiovisual capturing and/or recording device (e.g., camera, video camera, and/or mic and/or the like). As depicted the video camera may be directed towards the user. Interaction with element 132 may switch the view of video camera from a first view (e.g., frontal camera view) to a second view (e.g., back camera view). As the user is introducing themselves during the recording of this scene, the frontal camera view may be used. Interaction 140 with element 138 may begin the recording of audiovisual content. Element 138 may be a button or a virtual button. A user may interact with the element 138 via a touch screen device and/or a physical element (e.g., button) such as element 139.

The audiovisual content may be recorded during step 142. After completion of the recording the user may interact with element 138 a second time to stop the recording via action 144. Interaction 144 with element 138 may end the recording of audiovisual content. A user may interact with the element 138 via a touch screen device and/or a physical element (e.g., button) such as element 139 to stop the recording.

Upon completing the recording, the user may be provided the opportunity to review and/or re-record all or a portion of the scene. Once scene and/or the full review is accepted, the scene may be sent to a remote data store for subsequent retrieval for playback by other users wishing to view the content, that is, consume the full review and/or individual scenes thereof. The full review recorded by the user may be stored in association with an identifier of the product, such as a Global Trade Item Number (GTIN), for example, a UPC, ISBN, EAN or ASIN. In addition the full review may be stored in association with an order for playback of the scenes, which order may be predetermined or selected by the user. Other information that may be stored in association with the full review may include a creator identifier, device identifier, date stamp of creation, product identifier, and/or the like. The scenes of a full review may also be stored in association of certain information, such as a tag. The tag may identify the topic to which the scene is directed. Also, any information stored above in association with the full review may likewise be stored in association with the individual scenes of that full review. This information that is stored in association with the full review and/or scenes of the full review may be utilized for cataloging, sorting for presentation to users on a product page, searching, etc.

Illustrative Device Architecture

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Scene Drive Content Creation and Guidance

Figure 2:
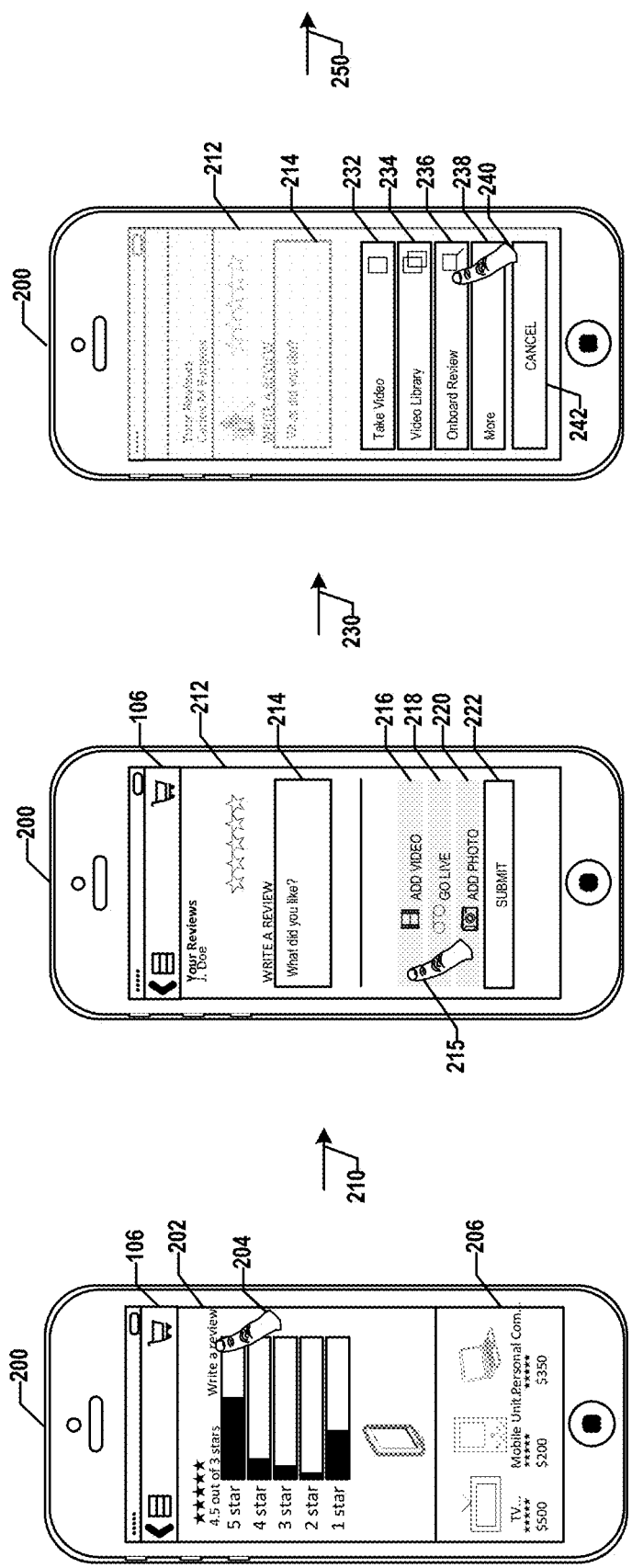
Figure 3B:
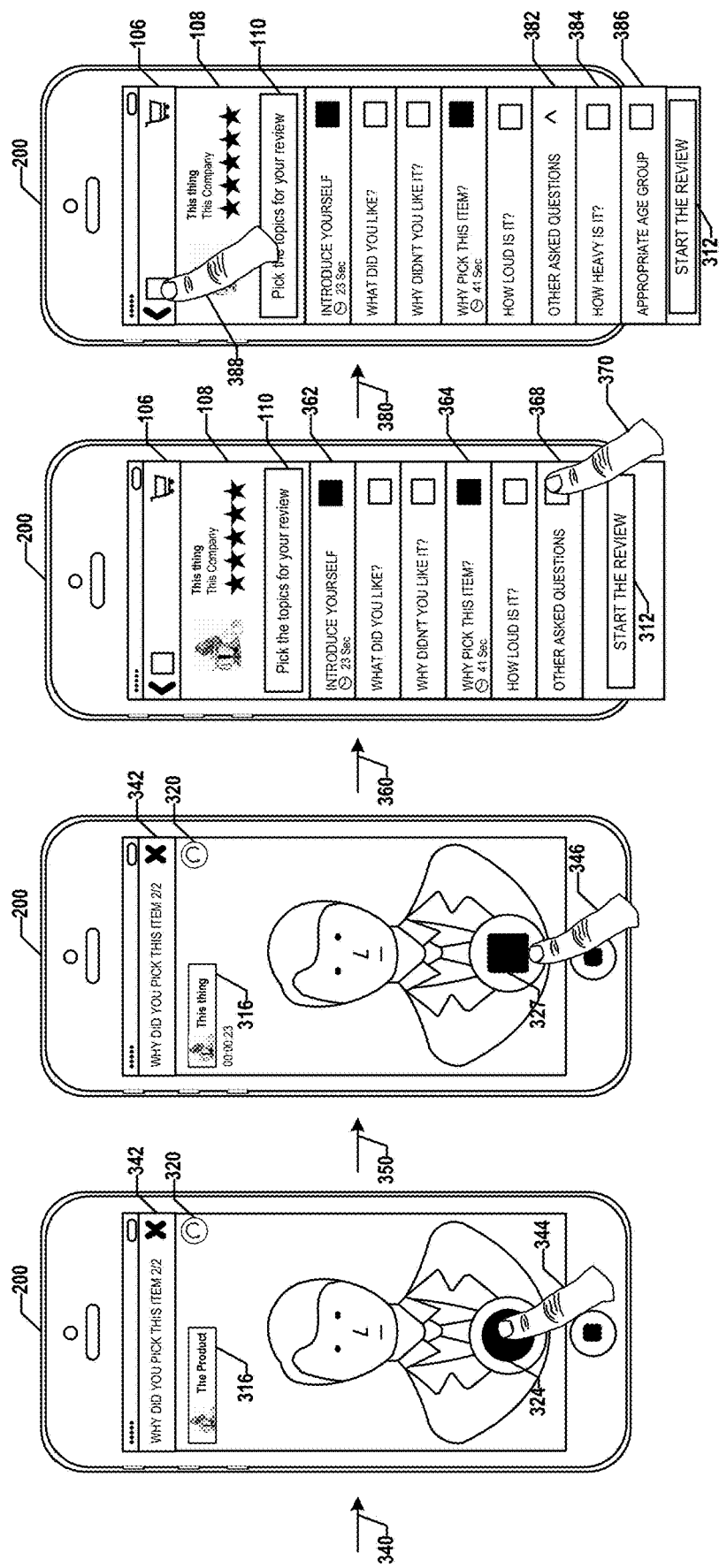

FIGS. 2, 3A-3B depict a device 200 operating according to one or more example embodiments of the disclosure. The device 200 may display section 106. Section 106 may include a first interaction element that allows the user to view a shopping cart including products that the user added to a virtual shopping cart. Section 106 may also include a browsing element and/or a mobile browsing element. The browsing element and/or mobile browsing element may be an element that allows the mobile device 101 to navigate through different pages of a retailer website.

Section 202 may display an aggregate star rating for a particular product as depicted. The aggregate score may reflect the scores provided by a plurality of users. User interaction 204 with the depicted "write a review" element may be provided by the user. Interaction 204 may initiate the review providing process. Element 206 may display other products that relate to the product being reviewed. Interactions with these products may cause the device 200 to display pages associated with these products. Interaction 204 may cause the device 200 to transition to step 210.

Section 212 may display an identifier of the reviewer (e.g., name of the reviewer) and/or an identifier of the product (e.g., product name). Section 212 may also include an element for providing a star rating in association with the product. The element may receive a selection between one star and five stars. Section 212 may also include an element 214 configured to receive user input. In one implementation, the user input may be a written review or a text review.

In one implementation, an element 216 may be displayed to allow the user to add a pre-recorded video or record a new video for presentation with their review. For example, interaction with the element 216 may display a plurality of pre-recorded videos stored on the device 200 and/or a remote data store. In one implementation, an element 218 may be displayed to allow the user to post a live recording of audiovisual content. In one implementation, an element 220 may be displayed to allow the user to add a photograph or a picture with their review. In one implementation, the photograph or picture may be pre-recorded. In a one implementation, the user device 200 may be configured to capture a picture in response to receiving an interaction with element 220.

In one implementation, once a user interaction 215 with element 216 is received, a user may then interact with element 222 for submitting the review. Once the review is submitted, the device 200 transitions to step 230. As depicted, after submission of the review, an overlay providing various options for providing a video review. In one implementation, the overlay may include element 232 for providing video review without guidance. In one implementation, the overlay may include element 234 for selecting a video from pre-recorded videos to upload with the review. As described above, interaction with the element 234 may display a plurality of pre-recorded videos stored on the device 200 and/or a remote data store.

In one implementation, element 236 may be displayed to allow the user to select a guided audiovisual content creation option. A user may provide user interaction 240 with element 236 to transition to step 250. Step 250 may optionally continue with the process depicted in FIG. 3A. Interaction with element 238 may display additional options for providing a video review and/or audiovisual content. In some implementations element 242 may be displayed for canceling the audiovisual content uploading process.

FIGS. 3A-3B depicts the device 200 during an example guided audiovisual content creation. The device 200 may display section 106. Section 106 may include a first interaction element that allows the user to view a shopping cart including products that the user added to a virtual shopping cart. Section 106 may also include a browsing element and/or a mobile browsing element. The browsing element and/or mobile browsing element may be an element that allows the device 200 to navigate through different pages of a retailer website.

The device 200 may also display section 108. Section 108 may include an element displaying a product identifier (e.g., product name) for the product being reviewed. Section 108 may also display an identifier of a manufacturer or distributor of the product (e.g., manufacturer name and/or logo, distributor name and/or logo). Section 108 may also include an element that displays an overall star rating of the product being reviewed. The user may, for example, select a rating between one star and five stars for the product. In one implementation, the user may interact with element that displays the overall star rating to provide a rating between one star and five stars for the product.

Element 110 may provide instructions to the user to guide the user during the audiovisual content creation. In the depicted implementation, the element 110 provides instructions to the user to select a topic for a first scene of an audiovisual review. The user may select between a first topic 302 for the scene "Introduce yourself," a second topic 304 "what did you like?," a third topic 307 "what didn't you like?," a fourth topic 308 "why pick this item?," and a fifth topic 310 "how loud it is?" The user may also select collapsible element "other asked questions" that when interacted with displays additional topics. For example, interaction with this element may cause a graphical element to be expanded to display additional topics for selection. In one implementation, the additional topics may be topics from frequently asked questions associated with the product. As depicted, the user may interact with element 302 to select the "introduce yourself" topic via user interaction 304 followed by interaction 311 with element 308. In turn, the user may interact with element 312 to start the recording of the selected scene via user interaction 314. The device 200 may then transition to step 306.

The device 200 may display element 318 including an identifier (e.g., scene topic) of the scene being recorded. In the depicted embodiment, element 318 may also display an indication of the number of consecutive scenes that will be recorded during a current guided audiovisual creation session. Element 318 may also include an interaction element for closing or minimizing element 318. Element 316 may display a product identifier (e.g., a product name) associated with the scene being recorded. Element 316 displays a current view of an audiovisual capturing and/or recording device (e.g., camera, video camera, and/or mic and/or the like). As depicted the video camera may be directed towards the user. Interaction with element 320 may switch the view of video camera from a first view (e.g., frontal camera view) to a second view (e.g., back camera view). As the user is introducing himself or herself during the recording of this scene, the frontal camera view may be used. Interaction 326 with element 324 may begin the recording of audiovisual content. Element 324 may be a button or a virtual button. A user may interact with the element 324 via a touch screen device and/or a physical element (e.g., button) such as element 139.

The audiovisual content may be recorded during step 322. After completion of the recording the user may interact with element 327 a second time to stop the recording via action 328. Interaction 328 with element 327 may end the recording of audiovisual content. A user may interact with the element 327 via a touch screen device and/or a physical element (e.g., button) such as element 139 to stop the recording. In one example element 324 changes to element 327 during step 322. Once the recording of audiovisual content is complete, the device 200 transition to step 330.

At step 330, the device 200 may display element 332 replacing element 318. Element 332 may display a consecutive topic associated with a consecutive scene. For example element 332 may display the topic "why did you pick this item," selected with action 311. Element 334 may display progress currently achieved during recording of a plurality of selected scenes. As depicted, element 334 displays that progress is approximately at 50%. Element 336 may display the next topic for the next scene. Element 336 may display a picture associated with the product being reviewed and/or the scene being recorded. Interaction with element 336 may cause the device 200 to proceed to step 340 and the recording of the next scene.

Interaction 344 with element 324 may start recording a scene associated with the topic "why did you pick this item." During step 350 the scene associated with this topic is recorded. Interaction 346 with element 327 may end recording of the scene. Once recording of the scene is complete, the device 200 may transition to step 360. At step 360, element 362 shows that a video was recorded for the topic of "introduce yourself," and that the video is 23 seconds.

Similarly, element 364 also shows that a video was recorded for the topic of "why pick this item?," was recorded and that the video is 41 seconds. A user may interact with element 368 may cause device 200 to display additional topics for selection by the user. In one implementation, the additional topics may be from frequently asked questions associated with the topic being reviewed. Once interaction 370 with element 368 is received the device 200 may transition to step 380.

Interaction 370 with element 368 may cause display of element 384 "How heavy is it?" and element 386 "appropriate age group." Element 382 may be interacted with to collapse elements 384 and 386. For example, interaction with element 382 may cause elements 384 and 386 to be no longer displayed. The user may select one or more element from elements 384 and 386 to add to the video review. In such case, similar steps to the steps discussed above may be performed to record additional scenes associated with the topics of elements 384 and 386. The user may interact with element 312 to start recording the additional scenes. In one implementation, interaction 388 with section 106 may complete the review and/or navigate to other pages of the website.

In one implementation, once the review is complete, it is transferred to a managing server to facilitate storage in a data store and/or a database. In one implementation, audiovisual content of the review is saved to the data store and/or database contiguously. In one implementation, each scene of the audiovisual content may be stored separately in association with one or more tags, such as a scene identifier and/or topic name. In one implementation, a contiguous audiovisual file may include various markers indicating a beginning and/or an end of each scene and a scene identifier for storage in association with the markers. In one implementation, each scene and/or contiguous file may be stored in association with a product identifier and/or name.

Figure 4A:
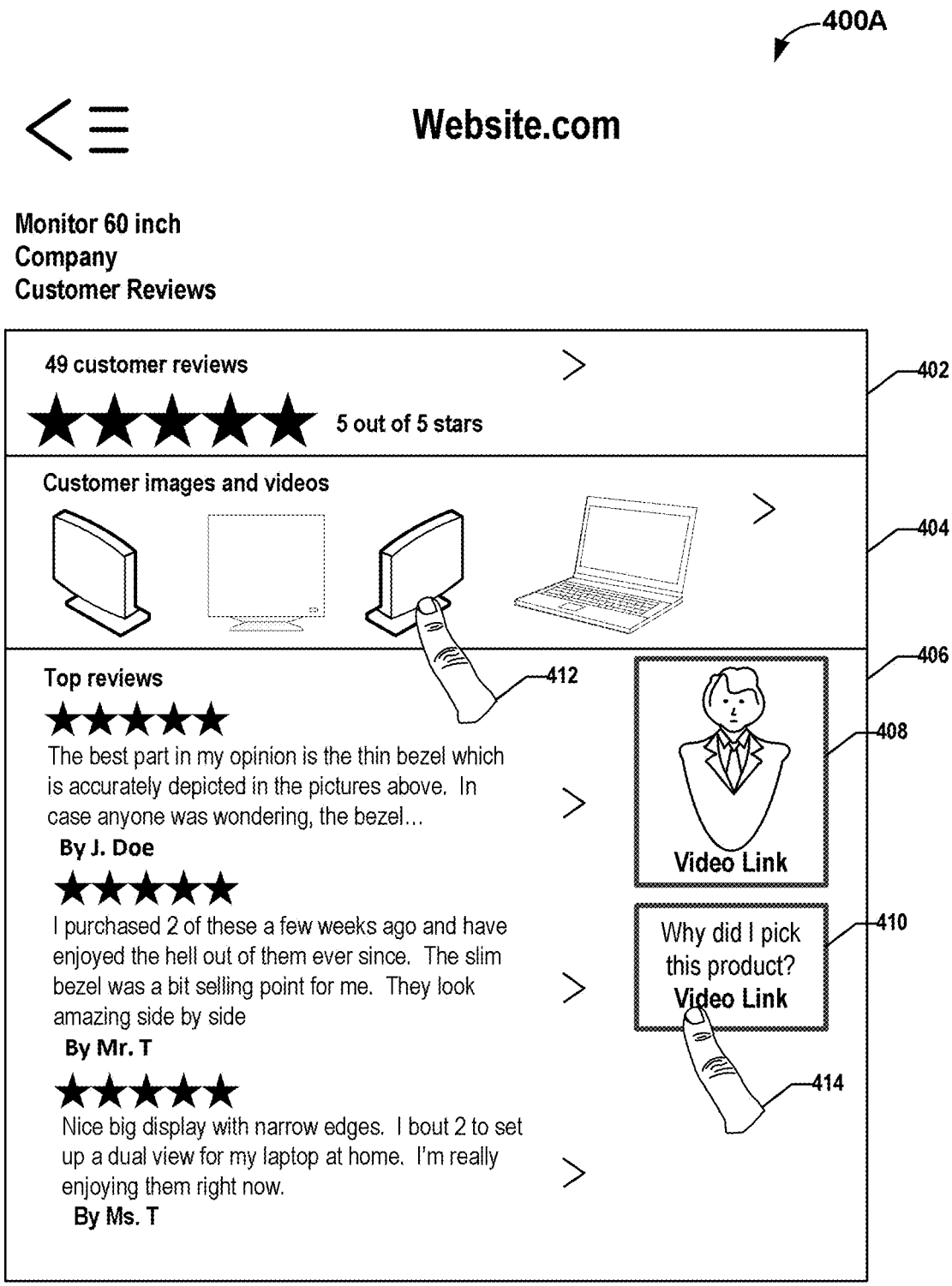
FIGS. 4A-4B illustrate example views of a Graphical User Interface (GUI) according to one or more example embodiments of the disclosure.

FIG. 4A illustrates example views of a Graphical User Interface (GUI) 400A according to one or more example embodiments of the disclosure. The depicted GUI 400A depicts a page associated with a review of a particular product. In this example, the particular product is a 60 inch monitor. An overall aggregate star rating may be displayed at section 402. Customers uploaded pictures and audiovisual content may be displayed at section 404. Such audiovisual content may include the video reviews described herein or scenes from the video reviews described herein. Section 406 may include individual reviews. The reviews may include the name of the reviewer. In some implementations, a video link may be provided within or adjacent to some reviews where the reviewer created a product review video in accordance with embodiments described herein. The video link 408 may be a full video review for the 60 inch monitor, which may include a plurality of scenes recorded by the reviewer and stored at a remote management server. The playback of the review to the shopper viewing the GUI 400A may include a sequential playback of the scenes of the review played in a predetermined order, which may have been determined by the reviewer at the time the video was created.

The video link 410 may be a scene (e.g., a scene from multiple scenes of the review associated with video link 408) associated with the topic "why did I pick this product?" Thus, interaction with video link 408 may cause streaming and/or downloading of a full video review, whereas interaction with video link 410 may cause streaming and/or downloading of a respective scene associated with the topic above. In some implementations, a frequently asked questions section for the product may include a plurality of links similar to video link 410. For example, the frequently asked question "how loud is it" may be accompanied by answers provided by the users and links for scenes associated with that topic. As another example, the GUI 400A may include a section (not shown) that includes topics of interest. The section (not shown) may include a plurality of video links to scenes associated with the specific product that is the subject of the reviews or competitive or similar products. The video links may be for scenes recorded as part of a video review. The scenes presented may be based on relevance to the product, metrics related to the frequently asked questions, and/or the like. Other sections of GUI 400A may include, for example, a search option for searching full reviews and/or scenes, which a search tool may utilize the tags and other information associated with the stored full reviews and scenes.

Figure 4B:
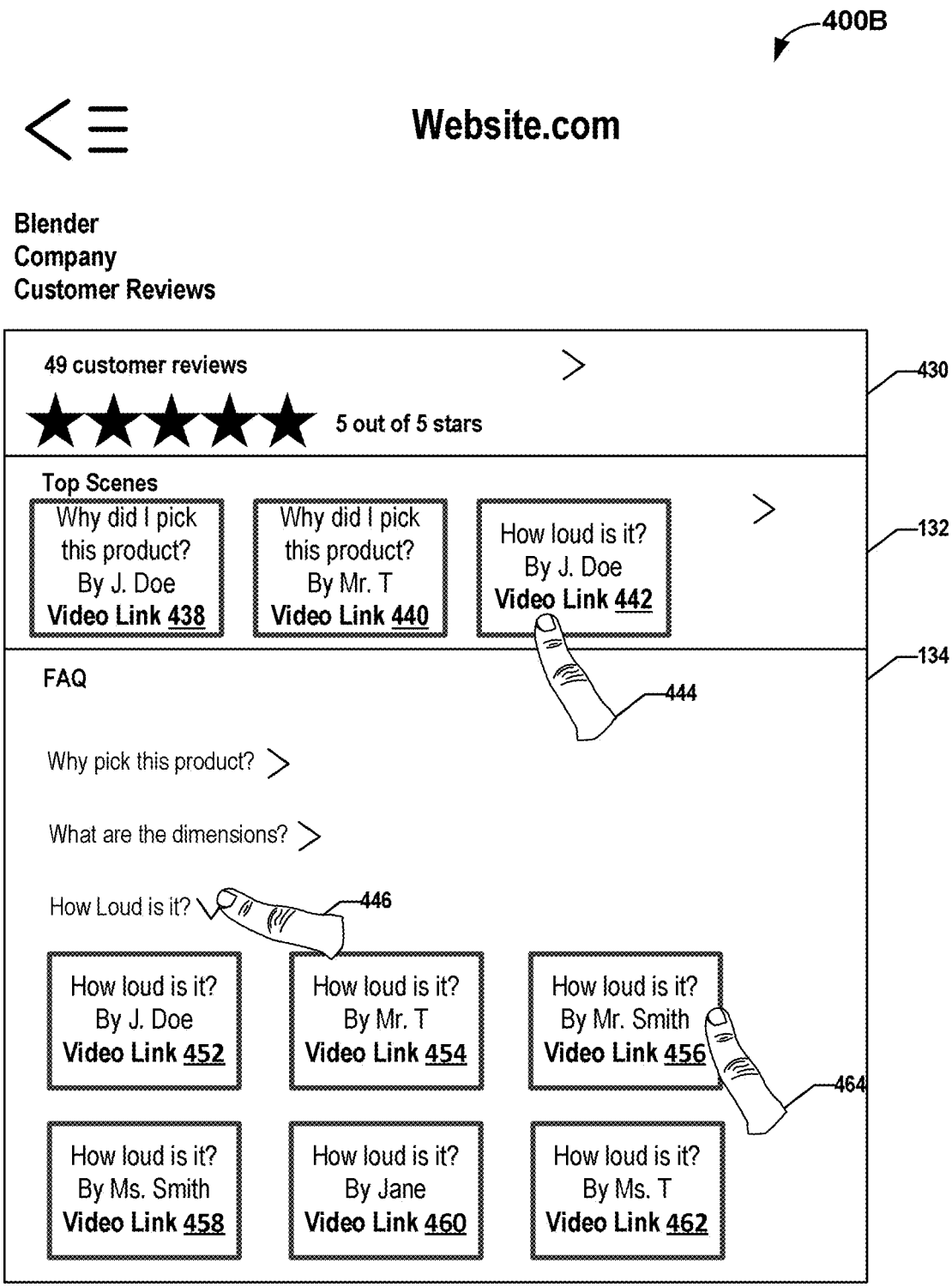

FIG. 4B illustrates example views of a Graphical User Interface (GUI) 400B according to one or more example embodiments of the disclosure. The depicted GUI 400B depicts a page associated with a particular product. The GUI 400B may include an identifier for the product (e.g., blender) and/or an identifier for the manufacturer or the seller of the product. Section 430 may include an overall aggregate rating of reviews of the product by a plurality of customers. Section 132 may include a plurality of links for top scenes associated with reviews of the product. In one example, the top scenes are selected according to a ranking of scenes based on views. For example, the top scenes may be the most viewed scenes associated with the product. In one example, the top scenes may be scenes that when viewed result in more conversions. For example, video link 438 may be for a scene that when viewed resulted in the most conversions for purchasing the product relative to the other scenes. In one example, the top scenes may be scenes that when viewed are likely to be viewed in their entirety. For example, video link 440 may be for a scene that during playback of the scene more users viewed the scene in its entirety relative to other scenes. In one example, top scenes may be scenes provided by top reviewers. A top reviewer may be a reviewer that receives high ratings from a plurality of shoppers indicating that their reviews are helpful. In one implementation, top scenes may be selected from highly rated reviews. Highly rated reviews may be reviews that received a rating indicate that the reviews are helpful from a threshold number of viewers.

Video link 442 may be for a second scene by the first reviewer "J. Doe" associated with video link 438. The video link 442 and 448 may be scenes from the same review by "J. Doe" for the product. User interaction 444 may select one of the video links 442, 440 and/or 438. Once a selection is made a respective scene may be downloaded or streamed for viewing.

Section 134 includes a plurality of Frequently Asked Questions (FAQ). The FAQ may include for example, "why pick this product?," "what are the dimensions?," and "how loud is it?" Interaction with each question may result in display of a plurality of scenes associated with that question. In the depicted example, interaction 446 with the "how loud is it?" question causes display of a plurality of scenes or links to scenes that address that question. A second interaction may cause the videos or links to be hidden as a portion of the GUI 400 collapses.

Video links 452, 454, 456, 458, 460, and 462 are links to scenes addressing the question "how loud is it?" Each video link may be a link for a scene created by a different user. In some examples, two scenes may be provided by the same user. Interaction 464 selects video link 456 for viewing. The user may select to view other scenes consecutively by interaction with other video links. In one example, the user may select to watch an entire video review that included the selected link. Similar natural grouping techniques may be used to present scenes from reviews and/or full reviews.

Computing Device

Figure 5A:
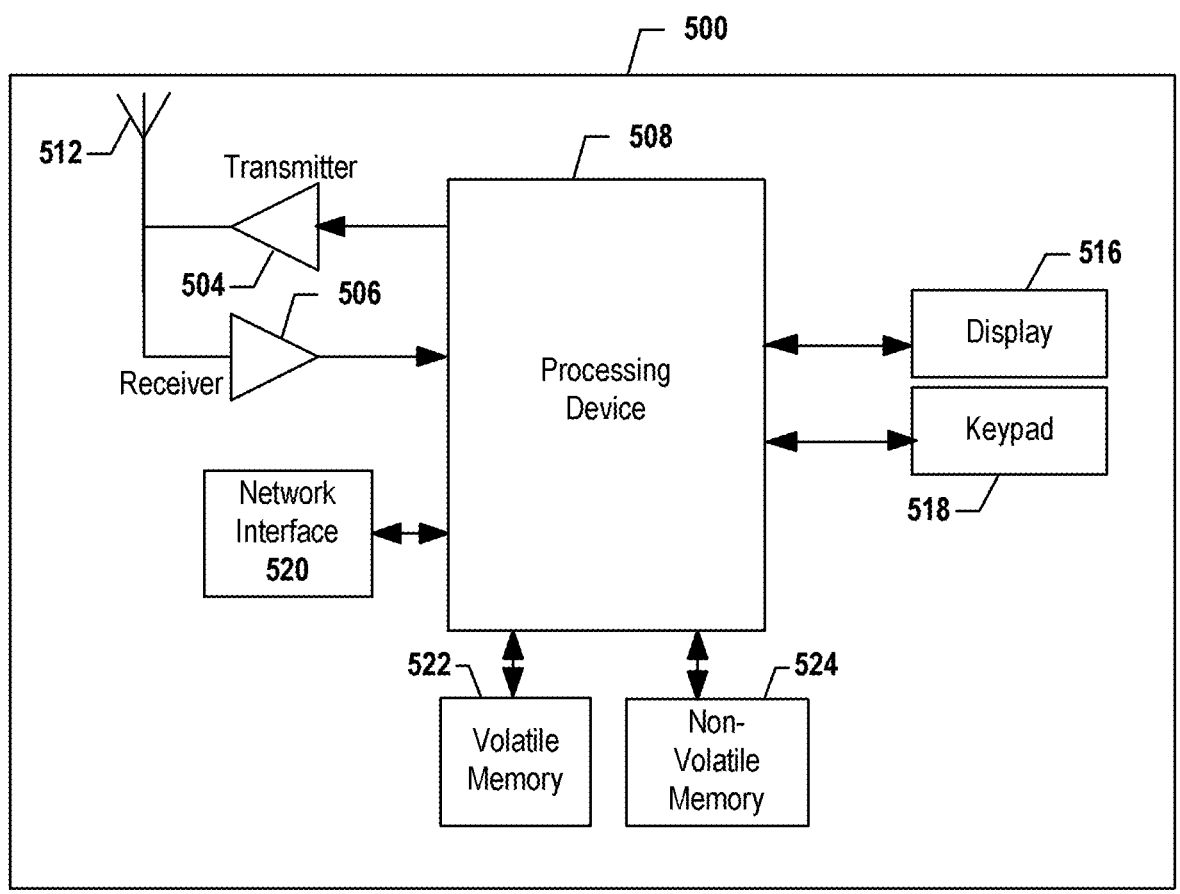
FIG. 5A illustrates an example schematic diagram of a computing device or entity according to one or more example embodiments of the disclosure.

FIG. 5A illustrates an example schematic diagram of a computing device 500 and/or an entity according to one or more example embodiments of the disclosure. In general, the terms user device, computing device, data processing apparatus, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing device 500 can be operated by various parties and/or automatically. As shown in FIG. 5A, the computing device 500 can include an antenna 512, a transmitter 504 (e.g., radio), a receiver 506 (e.g., radio), and a processing device 508 (e.g., CPLDs, microprocessors, multi-core processors, coprocessing entities, ASIPs, microcontrollers, and/or controllers) that provides signals to and receives signals from the transmitter 504 and the receiver 506, respectively.

The signals provided to and received from the transmitter 504 and the receiver 506, respectively, may include signaling information in accordance with air interface standards of applicable wireless systems. In this regard, the computing device 500 may be capable of operating with one or more air interface standards, communication protocols, modulation types, and access types. More particularly, the computing device 500 may operate in accordance with any of a number of wireless communication standards and protocols. In a particular embodiment, the computing device 500 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing device 500 may operate in accordance with multiple wired communication standards and protocols, via a network interface 520.

Via these communication standards and protocols, the computing device 500 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing device 500 can also download changes, add-ons, and updates, for instance, to its firmware, software (e.g., including executable instructions, applications, program modules), and operating system.

According to one embodiment, the computing device 500 may include location determining aspects, devices, modules, functionalities, and/or similar words used herein interchangeably. For example, the computing device 500 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing device 500 position in connection with a variety of other systems, including cellular towers, Wi-Fi access points, and/or the like. Similarly, the computing device 500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing device 500 may also comprise a user interface (that can include a display 516 coupled to a processing device 508) and/or a user input interface (coupled to a processing device 508). For example, the user interface may be a user application, browser, user interface, and/or similar words used herein interchangeably executing on and/or accessible via the computing device 500 to interact with and/or cause display of information. The user input interface can comprise any of a number of devices or interfaces allowing the computing device 500 to receive data, such as a keypad 518 (hard or soft), a touch display, voice/speech or motion interfaces, or other input devices. In embodiments including a keypad 518, the keypad 518 can include (or cause display of) the conventional numeric (0-9) and related keys (#, *), and other keys used for operating the computing device 500 and may include a full set of alphabetic keys or set of keys that may be activated to provide a full set of alphanumeric keys. In addition to providing input, the user input interface can be used, for example, to activate or deactivate certain functions, such as screen savers and/or sleep modes. The computing device 500 may also include an image and/or video capture device (not shown), such as a camera, and an audio device (not shown) for producing sound, such as a speaker, and/or for capturing audio, such as a microphone. The computing device 500 can also include volatile memory 522 and/or non-volatile memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the computing device 500. As indicated, this may include a user application that is resident on the respective device or accessible through a browser or other user interface for communicating with various other computing entities.

Example Operating Environment

Figure 5B:
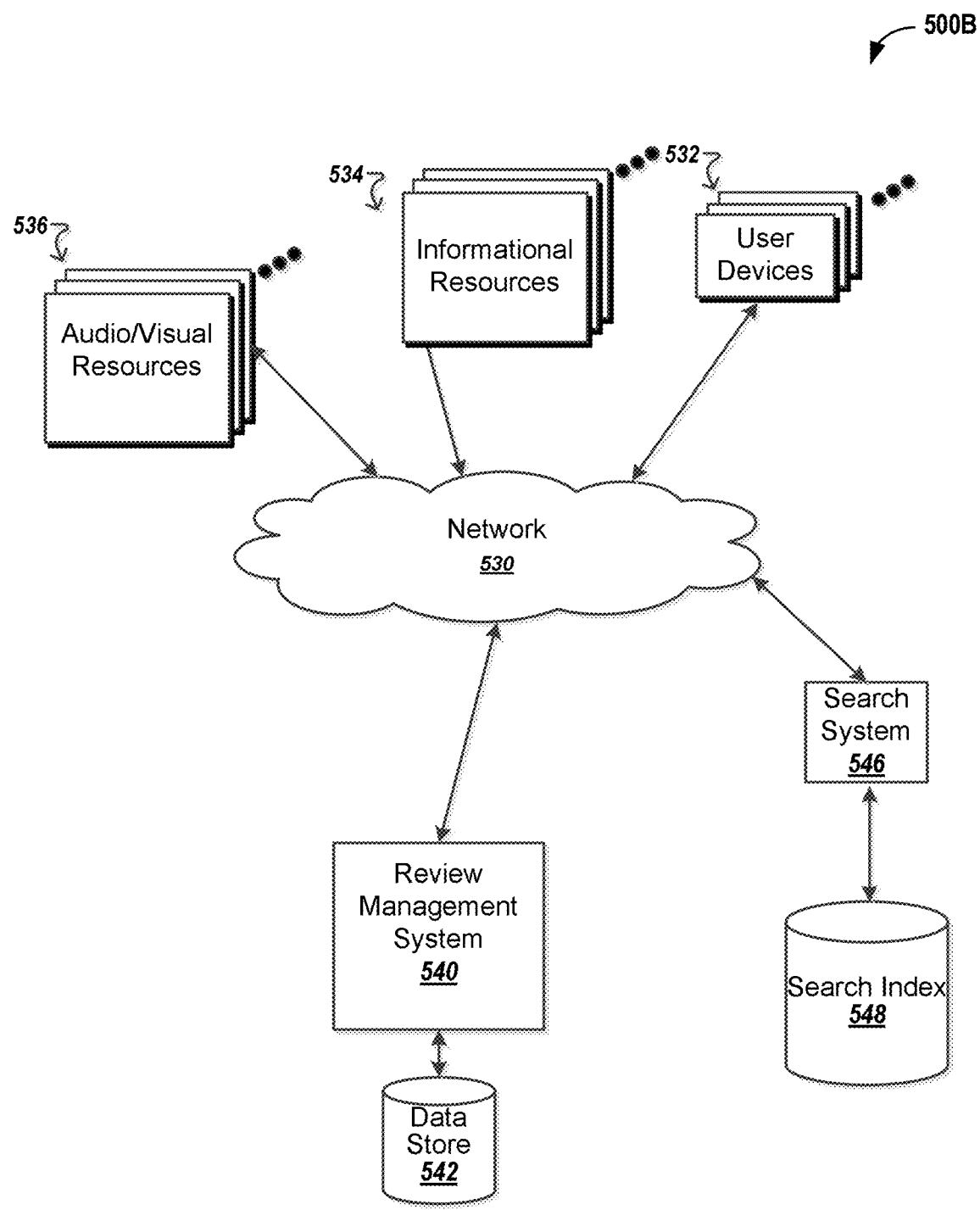
FIG. 5B illustrates an example environment in which computing devices or entities may operate according to one or more example embodiments of the disclosure.

FIG. 5B is a block diagram of an example environment 500B in which one or more user devices 532 may operate in accordance with one or more embodiments described herein. For example, the environment 500B includes a plurality of user devices 532 that may access and communicate with the review management system 540 and view audiovisual reviews and scenes. The example environment 500B also includes a network 530, such as a local area network (LAN), a wide area network (WAN), the Internet, or a combination thereof. The network 530 connects audio/visual resources 536, informational resources 534, user devices 532, review management system 540, and the search system 546. The example environment 500 may include many thousands of informational and audio/visual resources 536 and 534, and user devices 532.

Audio/visual and informational resources 536 and 534 are associated with domain names and hosted by one or more servers. For example, a website may comprise one or more audio/visual resources 536 hosted by one or more servers. A website may also comprise one or more informational resources 534 hosted by one or more servers. Still a website may be a combination of informational and audio/visual resources hosted by one or more servers. An example website is a collection of web pages formatted in hypertext markup language (HTML) that can contain text, images, multimedia content, and programming elements, such as scripts. Each website is maintained by a publisher, which is an entity that controls, manages and/or owns the website.

A resource is any information/data that can be provided over the network 530. A resource is identified by a resource address that is associated with the resource. Resources include HTML pages, word processing documents, and portable document format (PDF) documents, images, video, and feed sources, to name only a few. The resources can include content, such as words, phrases, images and sounds, that may include embedded information/data (such as meta-information in hyperlinks) and/or embedded instructions (such as JavaScript scripts).

A user device 532 is an electronic device that is under control of a user and is capable of requesting and receiving resources over the network 530. Example user devices 532 include personal computers, mobile communication devices, and other devices that can send and receive information/data over the network 530, such as computing device 500, as described herein. A user device 532 typically includes a user application, such as a web browser, to facilitate the sending and receiving of information/data over the network 530.

A user device 532 can request audio/visual resources 536 and informational resources 534 from websites. In turn, information/data representing these resources can be provided to the user device 532 for presentation by the user device 532. The information/data representing the resources can also include information/data specifying a portion of the resource or a portion of a user display (e.g., a presentation location of a pop-up window or in a specified area of a web page) in which advertisements can be presented.

To facilitate searching of these resources, the environment 500 can include a search system 546 that identifies the resources by crawling and indexing the resources provided by the publishers on websites. Information/data about the resources can be indexed based on the resource to which the information/data corresponds. The indexed and, optionally, cached copies of the resources are stored in a search index 548. In some implementations, the search system 546 may be for searching resources hosted by a specific publisher. For example, a search system 546 for an audio/visual publisher may have a dedicated search system for resources hosted on servers belonging to the audio/visual publisher. Such search systems may crawl and index resources hosted by servers belonging to the publisher. Similarly, a search system 546 for a retailer or a review service may have a dedicated search system for resources hosted on servers belonging to the retailer or the review service.

In some implementations, user devices 532 receive and store global positioning system (GPS) data. For example, user devices 532 may receive information/data from one or more satellites to enable the user devices to determine their current location and/or orientation. This information/data may be stored in association with time stamps. The stored information/data may be used to determine the location of user devices 532 at a time a specific action was performed.

Review management system 540 is responsible for collecting and storing reviews, audiovisual content associated with reviews and/or the like. In one implementation, the review management system may include one or more servers or computing devices, as described herein. The servers may be responsible for facilitating storage of review data, content associated with reviews, and for presenting the reviews to shoppers and potential customers. In some implementations, the servers may also facilitate conducting online sale transactions and providing advertisements to shoppers and/or users. The review management system may be in data communication with data store 542. The review management system may store audiovisual content such as videos and scenes as described herein in data store 542. The videos and scenes may be stored along with identifiers and tags as described above within data store 542. The identifiers and tags may be used by the review management system 540 to fetch relevant scenes and/or review videos from data store 542. In turn, the fetched scenes and/or review videos may be provided by review management system 540 to respective user devices 532 for display. In some implementations, data store 542 may be separated from review management system 540 and may be accessed via network 530.

Illustrative Processes

Figure 6:
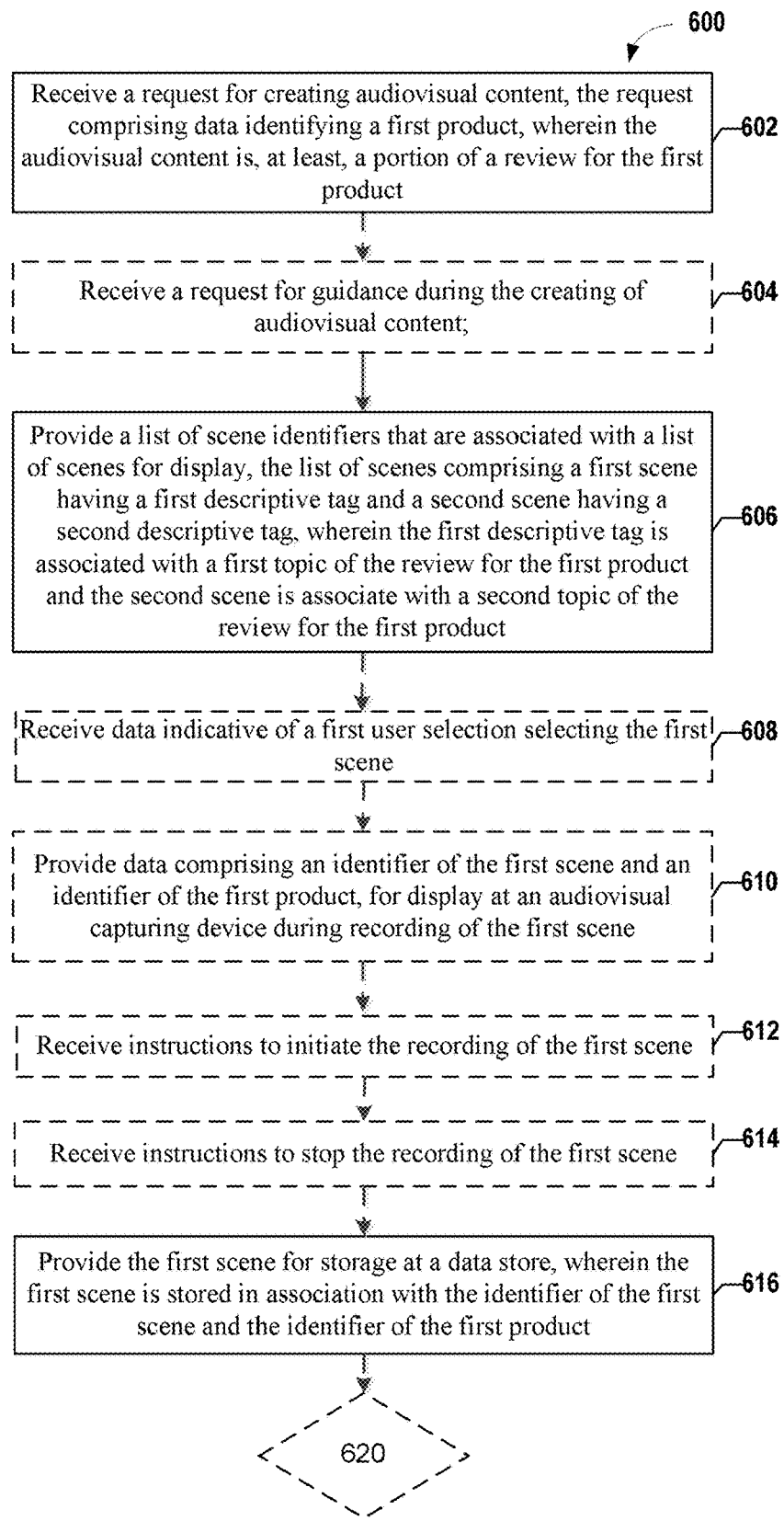
FIGS. 6-7, 8A-8C and 9 are flowcharts illustrating various procedures and operations that may be completed in accordance with various embodiments of the disclosure.

FIG. 6 is a flowchart of an example process 600 in accordance with various embodiments of the disclosure. The process 600 may be implemented by user device 532 (such as computing device 500) and/or review management system 540, in an illustrative embodiment. In one embodiment the steps of process 600 may be executed by, at least in part, the review management system 540. In a different embodiment the steps of process 600 may be executed by a user device 532. The process 600 may begin with receiving a request for creating audiovisual content, the request comprising data identifying a first product, wherein the audiovisual content is, at least, a portion of a review for the first product (602). For example, a user device 532 may receive a request for a video review of a monitor. In one example, the user device 532 is a mobile device (e.g., mobile phone, tablet and/or the like). In a different example, the review management system 540 may receive a request for a video review of a monitor. The review management system 540 may be, for example, one or more servers.

The process 600 may continue with optional step 604 shown in phantom. The process 600 may continue with receiving a request for guidance during the creation of audiovisual content (604). For example, the user may interact with user device 532 to request guided audiovisual content creation or select a scene based creation option.

The process 600 may then continue with providing a list or menu of scene identifiers that are associated with a list of scenes for display, the list of scenes comprising a first scene having a first descriptive tag and a second scene having a second descriptive tag, wherein the first descriptive tag is associated with a first aspect of the review for the first product and the second scene is associate with a second aspect of the review for the first product (606). For example, the user device 532 may provide for display a plurality of topic names for selection. Each topic name may represent a scene that the user will be guided through during capture. The descriptive tag may be, for example, the topic name associated with the scene or the scene name as depicted in FIGS. 3A-3B. The process 600 may then continue with receiving data indicative of a first user selection selecting the first scene (608). For example, the user may select the first scene associated with the first topic "How loud is it?" Once the user selects a scene, a tag and/or a topic the process 600 may continue with optional step 610. The process 600 may continue with providing data comprising an identifier of the first scene and an identifier of the first product, for display at an audiovisual capturing device during recording of the first scene (610). The user device 532 or review management server 540 may optionally provide, for example, the name of the first scene or the topic associated with the first scene and/or the name of the product being reviewed for display at an audiovisual capture device. In one example, the audiovisual capture device is the same user device 532.

The process 600 may continue with the optional step of receiving instructions to initiate the recording of the first scene (612). In one example, user device 532 may be used to capture audiovisual content. In one implementation, an overlay may be displayed containing the name of the product being reviewed and the name or topic of the scene during the audiovisual capture. The user may interact with user device 532 to capture audiovisual content for the first scene. The process 600 may then optionally continue with receiving instructions to stop the recording of the first scene (614). For example, the user may interact with user device 532 to finish recording of the audiovisual content.

In one implementation the process 600 may end with providing the first scene for storage at a data store, wherein the first scene is stored in association with the identifier of the first scene and the identifier of the first product (616). For example, user device 532 may provide the audiovisual data of the first scene for storage at data store in association with the scene name and/or topic and/or the product being reviewed. In one implementation the data store may be a remote data store or data store 542. In one implementation, review management service 540 may provide the audiovisual data of the first scene for storage at data store in association with the scene name and/or topic and/or the product being reviewed. In one implementation, the first scene may be stored in the cloud.

Figure 7:
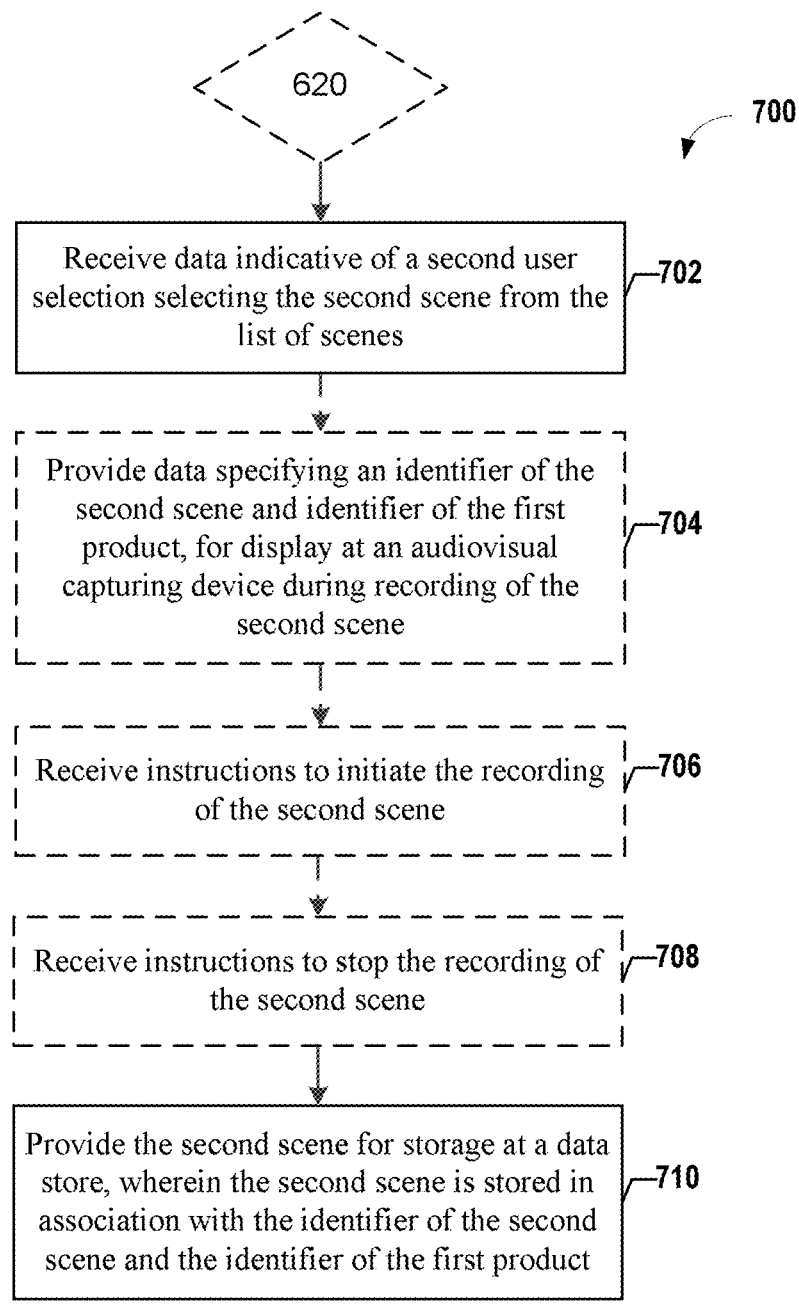

In one implementation, the process 600 may continue with the steps of process 700 of FIG. 7. The process 700 may begin with receiving data indicative of a second user selection selecting the second scene from the list of scenes (702). For example, the user may select a second scene having the topic "what did you like about it?" The process 700 may then, optionally, continue with providing data specifying an identifier of the second scene and identifier of the first product, for display at an audiovisual capturing device during recording of the second scene (704). For example, the user device 532 or review management server 540 may optionally provide the name of the second scene or the topic associated with the second scene and/or the name of the product being reviewed for display at an audiovisual capture device. In one example, the audiovisual capture device is the same user device 532.

The process 700 may continue with the optional step of receiving instructions to initiate the recording of the second scene (706). In one example, user device 532 may be used to capture audiovisual content. In one implementation, an overlay may be displayed containing the name of the product being reviewed and the name or topic of the scene during the audiovisual capture. The user may interact with user device 532 to capture audiovisual content for the second scene. The process 700 may then optionally continue with receiving instructions to stop the recording of the second scene (708). For example, the user may interact with user device 532 to finish recording of the audiovisual content.

In one implementation the process 700 may end with providing the second scene for storage at a data store, wherein the second scene is stored in association with the identifier of the second scene and the identifier of the first product (710). For example, user device 532 may provide the audiovisual data of the second scene for storage at data store in association with the second scene name and/or topic and/or the product being reviewed (e.g., monitor). In one implementation the data store may be a remote data store or data store 542. In one implementation, review management service 540 may provide the audiovisual data of the first scene for storage at data store in association with the scene name and/or topic and/or the product being reviewed. In one implementation, the first scene may be stored in the cloud.

Figure 8A:
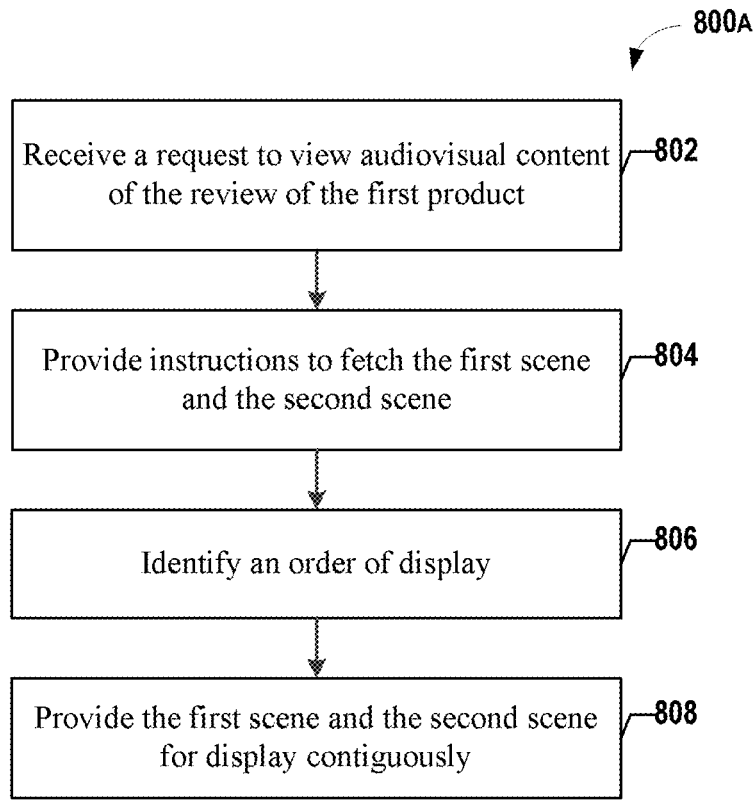
Figure 8B:
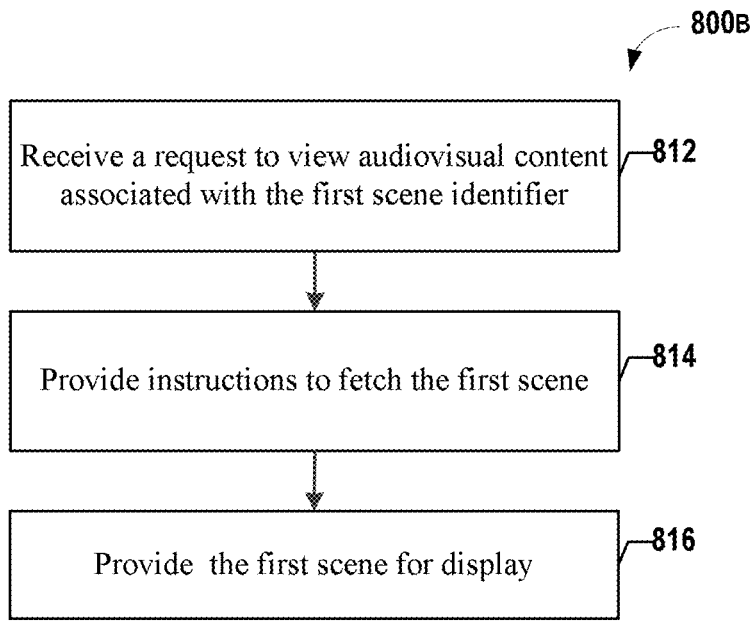
Figure 8C:
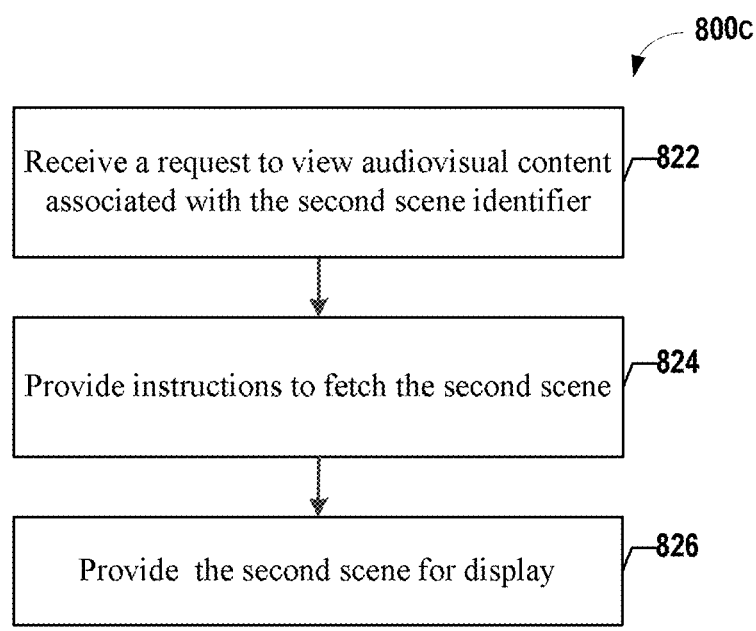

FIGS. 8A-8C are flowcharts of example processes 800A, 800B and 800C in accordance with various embodiments of the disclosure. The processes 800A, 800B and 800C may be implemented by user device 532 (such as computing device 500) and/or review management system 540, in an illustrative embodiment. In one embodiment the steps of processes 800A, 800B and 800C may be executed by, at least in part, the review management system 540. In a different embodiment the steps of processes 800A, 800B and 800C may be executed by a user device 532 and/or device 500. The process 800 may begin with receiving a request to view audiovisual content of the review of the first product (802). For example, a user device may provide a request to server management system 540 to receive or stream a video review of a first product. The process 800A may continue with providing instructions to fetch the first scene and the second scene (804). For example, server management system 540 may fetch the first scene and the second scene from data store 542. In turn, the process 800A may continue with identifying an order of display (806). For example, the first server management system may identify that the first scene is to be displayed before the second scene. In one implementation, the order may be predetermined and saved to data store 542. The process 800A may then continue with providing the first scene and the second scene for display contagiously (808). For example, server management system 540 may provide user device 532 the first scene and the second scene for display consecutively, in that order.

The process 800B may begin with receiving a request to view audiovisual content associated with the first scene identifier (812). For example, the user may access a link that initiates a request for audiovisual content associated with a "How loud is it?" topic that is included in a frequently asked questions section for a blender. The user may interact with the link to request the audiovisual content. The process 800B may continue with providing instructions to fetch the first scene (814). For example, review management service 540 may receive from a user device 532 a request to fetch the first scene from data store 542. The review management service may fetch first scene from the data store 542. Finally, the process 800B may end with providing the first scene for display (816). For example, user device 532 may provide the first scene for display to the user.

The process 800B may optionally continue with the process 800C. The process 800C may begin with receiving a request to view audiovisual content associated with the second scene identifier (822). For example, the user may access a link that initiates a request for audiovisual content associated with a "What did you not like about it?" topic that is included in a frequently asked questions section for the blender. The user may interact with the link to request the audiovisual content associated with that topic. The process 800C may continue with providing instructions to fetch the second scene (824). For example, review management service 540 may receive from a user device 532 a request to fetch the second scene from data store 542. The review management service may fetch the second scene from the data store 542. Finally, the process 800C may end with providing the second scene for display (826). For example, user device 532 may provide the second scene for display to the user.

Figure 9:
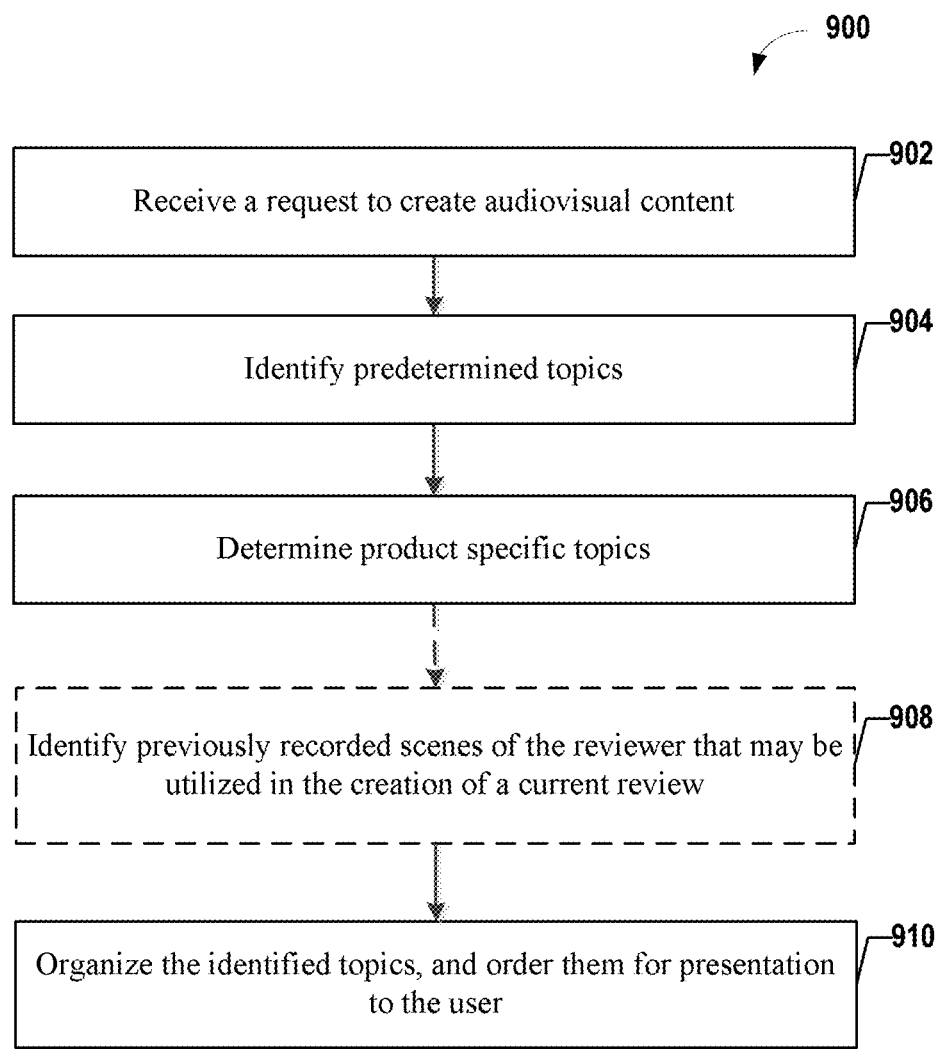

FIG. 9 is a flowchart of an example process 900 in accordance with various embodiments of the disclosure for determining the menu or listing of topics to present to the user, for example, in FIG. 1A. The process 900 may be implemented by user device 532 (such as computing device 500) and/or review management system 540, in an illustrative embodiment. In one embodiment the steps of process 900 may be executed by, at least in part, the review management system 540. In a different embodiment the steps of process 900 may be executed by a user device 532. The process 900 may begin with receiving a request to create audiovisual content, such as a product review video (902). The request may include, among other information, a product identifier and user or account identifier. The process 900 then identifies predetermined topics (904). For example, predetermined topics maybe those typically included or required, such as an "introduce yourself," or "why did you buy" topics that may be considered generic to most purchases and/or reviews. The process 900 may then determine any product specific topics (906). For example, if the product is a blender, the product specific topics may include "how loud is it," what mixing options does it include," or "what does it weigh." These topics may be identified based on product questions (for example, FAQ's), product comments, social media, ratings and views of the same or similar topics as recorded by other reviewers, etc. The process may then proceed to an optional step of identifying previously recorded scenes of the reviewer that may be utilized in the creation of a current review (908). This may include, for instance, an introduction the review previously prepared, or a scene form a prior review made by the reviewer for the same or similar product. A previously recorded scene may be associated with multiple reviews. For example, a single "introduce yourself" scene may be associated with a plurality of reviews of the same reviewer. The process 900 may then organize the identified topics, and order them for presentation to the user (910). This may include presenting only an initial listing of topics, with other topics available should the reviewer request more topics to choose from.

It should be understood that the processes, operations, and functionality described above may be performed by or implemented in or by a plurality of systems. For example, the processes, operations, and functionality above may be implemented in batteries, battery powered electronic devices, remote management systems, computing entities, and/or the like. The processes, operations, and functionality may be applied to batteries during operation and/or manufacturing.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Additional Implementation Details

Although an example processing system and/or device has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, information/data processing apparatus. Alternatively, or in addition, the program instructions can be encoded on an artificially generated propagated signal, (e.g., a machine-generated electrical, optical, or electromagnetic signal), which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations, of the foregoing. The apparatus can include special purpose logic circuitry, (e.g., an FPGA (field programmable gate array)) or an ASIC (application-specific integrated circuit). The apparatus can also include, in addition to hardware, code that creates an execution environment for the computer program in question, (e.g., code that constitutes processor firmware), a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, (e.g., magnetic, magneto-optical disks, or optical disks). However, a computer need not have such devices. Devices suitable for storing computer program instructions and information/data include all forms of non-volatile memory, media and memory devices, including by way of example semiconductor memory devices, (e.g., EPROM, EEPROM, and flash memory devices); magnetic disks, (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, (e.g., a mouse or a trackball), by which the user can provide input to the computer. Other kinds of devices can be used to provide for interaction with a user as well; for example, feedback provided to the user can be any form of sensory feedback, (e.g., visual feedback, auditory feedback, or tactile feedback); and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, (e.g., as an information/data server), or that includes a middleware component, (e.g., an application server), or that includes a front-end component, (e.g., a client computer having a graphical user interface or a web browser through which a user can interact with an implementation of the subject matter described herein), or any combination of one or more such back-end, middleware, or front-end components. The components of the system can be interconnected by any form or medium of digital information/data communication, (e.g., a communication network). Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of the client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for scene driven content creation comprising:

receiving, by one or more computer processors coupled to at least one memory and from a mobile device, a request for creating audiovisual content that is at least a portion of a review for a first product, the request comprising data identifying the first product and an user account;

providing, to the mobile device, a list of scenes for display at the mobile device wherein selecting a scene from the list of scenes initiates a process for recording the scene, the list of scenes comprising a first scene having a first descriptive tag and a second scene having a second descriptive tag, wherein the first descriptive tag is associated with a first topic of the review for the first product and the second scene is associate with a second topic of the review for the first product;

receiving, from the mobile device, data indicative of a first user selection of the first scene from the list of scenes;

providing, to the mobile device, data comprising an identifier of the first scene and an identifier of the first product, for display at an audiovisual capturing device during recording of the first scene;

receiving, from the mobile device, the first scene wherein the first scene comprises audiovisual data recorded at the mobile device and wherein the first scene is at least a portion of the review for the first product;

providing the first scene for storage at a data store, wherein the first scene is stored in association with the identifier of the first scene and the identifier of the first product and the user account, wherein the first scene is stored as a first file, and wherein the second scene is stored as a second file;

receiving a request to view audiovisual content associated with the first product; and providing the first scene and the second scene for display contiguously.

2. The method of claim 1, further comprising:
receiving, from the mobile device, data indicative of a second user selection specifying the second scene from the list of scenes;
providing, to the mobile device, data specifying an identifier of the second scene and the identifier of the first product, for display at an audiovisual capturing device during recording of the second scene;
receiving, from the mobile device, the second scene wherein the second scene comprises audiovisual data recorded at the mobile device; and
providing the second scene for storage at the data store, wherein the second scene is stored in association with the identifier of the second scene, the identifier of the first product and data indicative of an order of display of the first and second scene.

3. The method of claim 2, wherein the first topic is a topic from frequently asked questions associated with the first product that was viewed by more than a threshold number of shoppers during a pre-specified period of time and wherein the first scene is at least a portion of a review for a second product.

4. The method of claim 2, wherein providing the first scene and the second scene for display contiguously comprises providing the first scene and the second scene based, at least in part, on the order of display.

5. A system comprising:
a data processing apparatus; and
a first memory in data communication with the data processing apparatus and storing instructions executable by the data processing apparatus that upon such execution cause the data processing apparatus to perform operations comprising:
receiving a request for creating audiovisual content that is, at least, a portion of a review for a first product, the request comprising data identifying the first product;
providing a list of scene identifiers that are associated with a list of scenes for display, the list of scenes comprising a first scene having a first descriptive tag and a second scene having a second descriptive tag, wherein the first descriptive tag is associated with a first topic of the review for the first product and the second scene is associated with a second topic of the review for the first product;
receiving data indicative of a first user selection selecting the first scene;
providing data comprising an identifier of the first scene and an identifier of the first product, for display at an audiovisual capturing device during a recording of the first scene;
providing the first scene for storage at a data store, wherein the first scene is stored in association with the identifier of the first scene and the identifier of the first product, wherein the first scene is stored as a first file, and wherein the second scene is stored as a second file;
receiving a request to view audiovisual content associated with the first product; and
providing the first scene and the second scene for display contiguously.

6. The system of claim 5, wherein the operations further comprise:
receiving data indicative of a second user selection selecting the second scene from the list of scenes;
providing data specifying an identifier of the second scene and the identifier of the first product, for display at an audiovisual capturing device during recording of the second scene; and
providing the second scene for storage at the data store, wherein the second scene is stored in association with the identifier of the second scene and the identifier of the first product.

7. The system of claim 5, wherein the list of scene identifiers is determined based, at least in part, a question associated with the first product.

8. The system of claim 5, wherein the operations further comprise determining the list of scene identifiers based, at least in part, on one or more frequently asked questions associated with the first product, predetermined scenes for reviews, previously created scenes associated with a user account, and feature-specific scenes associated with the first product.

9. The system of claim 5, wherein the operations further comprise:
providing instructions to fetch the first scene and the second scene; and
providing instructions to fetch an order of display for displaying the first scene and the second scene, wherein providing the first scene and the second scene for display contiguously is based, at least in part, on the order of display.

10. The system of claim 5, wherein the operations further comprise:
receiving a request to view audiovisual content associated with the identifier of the first scene; and
providing the first scene for display.

11. The system of claim 5, wherein the operations further comprise:
receiving instructions to initiate the recording of the first scene; and
receiving instructions to stop the recording of the first scene.

12. The system of claim 6, wherein the operations further comprise:
receiving an indication that the recording of the first scene is complete;
providing, for display, a message inquiring whether a user is ready to record the second scene; and
receiving data indicative of a selection to record the second scene.

13. The system of claim 5, wherein the operations further comprise receiving data specifying an order of display for the first and the second scene.

14. The system of claim 6, wherein the operations further comprise fetching, from the data store, data indicative of an order specifying that the first scene supersedes the second scene.

15. A non-transitory computer-readable storage medium having computer-readable program code portions stored thereon that, when executed by one or more computing devices, cause the computing devices to perform operations comprising:
receiving a request for creating audiovisual content that is, at least, a portion of a review for a first product, the request comprising data identifying the first product;
providing a list of scene identifiers that are associated with a list of scenes for display, the list of scenes comprising a first scene having a first descriptive tag and a second scene having a second descriptive tag, wherein the first descriptive tag is associated with a first topic of the review for the first product and the second scene is associated with a second topic of the review for the first product;

receiving data indicative of a first user selection selecting the first scene;

providing data comprising an identifier of the first scene and an identifier of the first product, for display at an audiovisual capturing device during a recording of the first scene;

providing the first scene for storage at a data store, wherein the first scene is stored in association with the identifier of the first scene and the identifier of the first product, wherein the first scene is stored as a first file, and wherein the second scene is stored as a second file;

receiving a request to view audiovisual content associated with the first product; and providing the first scene and the second scene for display contiguously.

16. The non-transitory computer-readable storage medium of claim 15, wherein the operations further comprise:

receiving data indicative of a second user selection selecting the second scene from the list of scenes;

providing data specifying an identifier of the second scene and the identifier of the first product, for display at an audiovisual capturing device during recording of the second scene; and providing the second scene for storage at a data store, wherein the second scene is stored in association with the identifier of the second scene and the identifier of the first product.

17. The non-transitory computer-readable storage medium of claim 15, wherein the operations further comprise:

providing instructions to fetch the first scene and the second scene;

providing instructions to fetch an order of display for displaying the first scene and the second scene, wherein providing the first scene and the second scene for display contiguously is based, at least in part, on the order of display.

18. The non-transitory computer-readable storage medium of claim 15, wherein the operations further comprise:

receiving a request to view audiovisual content associated with the identifier of the first scene;

providing instructions to fetch the first scene; and providing the first scene for display.

19. The non-transitory computer-readable storage medium of claim 15, wherein the operations further comprise fetching, from the data store, data indicative of an order specifying that the first scene supersedes the second scene.

20. The non-transitory computer-readable storage medium of claim 15, wherein the operations further comprise fetching, from the data store, data indicative of an order specifying that the first scene supersedes the second scene.

* * * * *